United States Patent
Lee et al.

(10) Patent No.: US 11,990,660 B2
(45) Date of Patent: May 21, 2024

(54) PHASE SHIFTER INCLUDING A PLURALITY OF PHASE TRANSFORMATION UNITS COMPRISED OF OVERLAPPING CIRCUIT PATTERNS WHICH ARE MOVED WITH RESPECT TO EACH OTHER BY A DRIVING UNIT

(71) Applicant: GigaLane Co., Ltd., Hwaseong-si (KR)

(72) Inventors: Jae-jun Lee, Hwaseong-si (KR);
Dae-ho Kim, Hwaseong-si (KR);
Eun-kuk Park, Hwaseong-si (KR);
Hee-seok Jung, Hwaseong-si (KR)

(73) Assignee: GigaLane Co., Ltd., Hwaseong-si (KR)

( * ) Notice: Subject to any disclaimer, the term of this patent is extended or adjusted under 35 U.S.C. 154(b) by 18 days.

(21) Appl. No.: 17/723,514

(22) Filed: Apr. 19, 2022

(65) Prior Publication Data
US 2023/0018986 A1 Jan. 19, 2023

(30) Foreign Application Priority Data

Jul. 8, 2021 (KR) .......................... 10-2021-0089757
Nov. 4, 2021 (KR) .......................... 10-2021-0150602

(51) Int. Cl.
*H01P 1/18* (2006.01)
*H01Q 3/32* (2006.01)
*H02K 7/116* (2006.01)

(52) U.S. Cl.
CPC ............... *H01P 1/184* (2013.01); *H01P 1/18* (2013.01); *H01Q 3/32* (2013.01); *H02K 7/116* (2013.01)

(58) Field of Classification Search
CPC .................................. H01P 1/184; H01P 1/18
USPC .......................................................... 333/161
See application file for complete search history.

(56) References Cited

U.S. PATENT DOCUMENTS

| | | | |
|---|---|---|---|
| 7,034,748 B2 | 4/2006 | Kajiya | |
| 7,253,782 B2 | 8/2007 | Davies | |
| 2003/0016097 A1* | 1/2003 | McKinzie et al. ... | H01Q 3/2682 333/161 |
| 2005/0248494 A1 | 11/2005 | Davies | |
| 2012/0056692 A1* | 3/2012 | Moon et al. ............. | H01Q 3/26 333/136 |

(Continued)

FOREIGN PATENT DOCUMENTS

| | | |
|---|---|---|
| CN | 104103875 A | 10/2014 |
| CN | 112271420 A | 1/2021 |

(Continued)

*Primary Examiner* — Benny T Lee
(74) *Attorney, Agent, or Firm* — Shih IP Law Group, PLLC.

(57) ABSTRACT

Provided is a phase transformation method performed by a phase shifter including a support frame, a plurality of phase transformation units on the support frame, an operation unit connected to the plurality of phase transformation units to synchronize phases, which are to be transformed through the plurality of phase transformation units, with each other, and a driving unit configured to operate the operation unit, wherein each of the plurality of phase transformation units includes a first circuit pattern, and a second circuit pattern connected to the first circuit pattern while a region of the second circuit pattern overlaps the first circuit pattern, and a length of the region of the second circuit pattern overlapping the first circuit pattern changes when the operation unit is operated.

17 Claims, 10 Drawing Sheets

(56) References Cited

U.S. PATENT DOCUMENTS

| | | | |
|---|---|---|---|
| 2016/0064817 A1* | 3/2016 | Liu et al. | H01P 1/184 343/853 |
| 2017/0005388 A1 | 1/2017 | Hsu | |
| 2018/0337438 A1 | 11/2018 | So | |

FOREIGN PATENT DOCUMENTS

| | | |
|---|---|---|
| JP | 2009-147442 A | 7/2009 |
| JP | 2011217299 A | 10/2011 |
| JP | 2017-188750 A | 10/2017 |
| KR | 10-1998-0019423 A | 10/2000 |
| KR | 10-2004-0005104 A | 1/2004 |
| KR | 1020110100447 A | 9/2011 |
| KR | 10-1150465 B1 | 6/2012 |
| KR | 101472422 B1 | 12/2014 |
| KR | 101567882 B1 | 11/2015 |
| KR | 101586424 B1 | 1/2016 |
| KR | 101771240 B1 | 9/2017 |
| KR | 10-2020-0006880 A | 1/2020 |

* cited by examiner

PHASE SHIFTER INCLUDING A PLURALITY OF PHASE TRANSFORMATION UNITS COMPRISED OF OVERLAPPING CIRCUIT PATTERNS WHICH ARE MOVED WITH RESPECT TO EACH OTHER BY A DRIVING UNIT

CROSS-REFERENCE TO RELATED APPLICATIONS

This application claims the benefit under 35 U.S.C. § 119 of a Korean patent application No. 10-2021-0089757 filed on Jul. 8, 2021, and a Korean patent application No. 10-2021-0150602 filed on Nov. 4, 2021 in the Korean Intellectual Property Office, the entire disclosures of which are hereby incorporated herein by reference.

TECHNICAL FIELD

The present disclosure relates to a phase shifter, a phase transformation unit, and a phase transformation method.

BACKGROUND

Recently, with the introduction of newly expanded 5G services in mobile communication systems, much attention has been paid to multiple-input multiple-output (MIMO) antenna technology.

In general, in 5G services, a beamforming method is applied to the MIMO antenna technology. In the beamforming method, a steering angle of a beam emitted from an antenna is changed by a phase shifter. The phase shifter includes a plurality of phase transformation units connected to a plurality of antennas to shift, i.e., transform, phases of signals to be transmitted to the plurality of antennas.

The number of antennas in base station equipment providing a 5G service is 64, and the number of phase transformation units of the phase shifter is equal to the number of the antennas. For example, when a hybrid beamforming method (2 sub-array method) of connecting two antennas to one transceiver is employed, the number of phase transformation units may be 32.

As such, when the number of phase transformation units increases, phases to be transformed through the phase transformation units are not likely to be synchronized with each other.

The background art of the invention is introduced herein to help understanding of the present disclosure. Any disclosures of the background art of the invention should not be considered as an admission of the existence of prior art in the related field.

RELATED ART DOCUMENT

Patent Document (Patent Document 1) KR10-1586424B1 (Jan. 12, 2016)
(Patent Document 2) US7253782B2 (Aug. 7, 2007)
(Patent Document 3) KR10-1771240B1 (Sep. 9, 2017)
(Patent Document 4) KR10-1567882B1 (Nov. 4, 2015)

Technical Problem

The present disclosure is directed to providing a phase shifter, a phase transformation unit, and a phase transformation method for synchronizing respective phases; which are to be transformed by a plurality of phase transformation units.

Aspects of the present disclosure are not limited thereto and other aspects not mentioned here will be clearly understood from the following description.

Technical Solution

An aspect of the present disclosure provides a phase shifter including a support frame, a plurality of phase transformation units on the support frame, an operation unit connected to the plurality of phase transformation units to synchronize phases, which are to be transformed through the plurality of phase transformation units, with each other, and a driving unit configured to operate the operation unit, wherein each of the plurality of phase transformation units includes a first circuit pattern, and a second circuit pattern connected to the first circuit pattern while a region of the second circuit pattern overlaps the first circuit pattern.

In an embodiment, a length of the region of the second circuit pattern overlapping the first circuit pattern may change when the operation unit is operated.

In an embodiment, the plurality of phase transformation units may be arranged on the support frame in a plurality of arrays spaced apart from each other in a first direction.

In an embodiment, the operation unit may include a plurality of operation bars configured to connect a side of each of the plurality of phase transformation units to one of the plurality of arrays, and one or more guide bars configured to connect the plurality of operation bars.

In an embodiment, the driving unit may include a motor with a rotation shaft, and a plurality of gears rotated in connection with the rotation shaft.

In an embodiment, the plurality of operation bars may be moved in connection with the rotation of the plurality of gears using the rotation shaft and thus the plurality of operation bars and one sides of the plurality of phase transformation units connected to the plurality of operation bars may be moved in the same direction by a driving force delivered from the motor.

In an embodiment, each of the one or more guide bars may include a first guide portion provided to face the support frame, a second guide portion bent from the first guide portion and extending in a direction away from the support frame, and a third guide portion bent from the second guide portion and extending in parallel to the first guide portion.

In an embodiment, each of the one or more guide bars may further include a first guide roller on the first guide portion, and a second guide roller below the third guide portion.

In an embodiment, the first guide roller and the second guide roller may limit movement of the one or more guide bars on a plane of the support frame in a second direction perpendicular to the first direction, and limit movement of the one or more guide bars on the same plane in a third direction perpendicular to the first direction and the second direction.

In an embodiment, a lower surface of the first guide roller may be in contact with the first guide portion and a side surface thereof may be in contact with one side surface of the second guide portion, an upper surface of the second guide roller may be in contact with the third guide portion and a side surface thereof may be in contact with another side surface of the second guide portion, and the first guide roller and the second guide roller may be rotated about rotation axes arranged in parallel to each other.

In an embodiment, the first guide roller and the second guide roller may be formed of a combination of at least one of polyphenylene sulfide (PPS), a liquid crystal polymer (LCP), and polytetrafluoroethylene (PPTE).

In an embodiment, each of the plurality of phase transformation units may include a first circuit board with a first circuit pattern, a second circuit board with a second circuit pattern, and a moving member configured to move the second circuit board in a first direction to change an overlap length of the first circuit pattern and the second circuit pattern, and the moving member may include a first moving part on which the second circuit board is disposed, and a second moving part extending from the first moving part and fixedly combined with the operation unit.

In an embodiment, the moving member may have an elastic structure for pressurizing the second circuit board by an elastic force in a direction in which the first circuit board is located to connect the second circuit pattern to the first circuit pattern.

In an embodiment, in the moving member, the first moving part may have a cantilever shape having a free end.

In an embodiment, the moving member may further include an elastic member between the second circuit board and the first moving part.

In an embodiment, the elastic member may further include a protrusion on at least one of both sides of the elastic member to be in contact with the first moving part or the second circuit board, an inner region of the protrusion may be an empty space, and the empty space may be compressed when the first circuit board is pressurized against the second circuit board through the protrusion.

In an embodiment, the phase shifter may further include a fixing part having an arch shape, both sides of the arch shape fixing part are fixed onto the support frame and an opening between both sides of the fixing part fixed on the support frame.

In an embodiment, when at least one operation bar of the plurality of operation bars passes through the opening of the fixing part, movement of the at least one operation bar in a third direction perpendicular to the first direction may be limited.

Another aspect of the present disclosure provides a phase shifter including a support frame, a plurality of phase transformation units on the support frame, and an operation unit connected to the plurality of phase transformation units to synchronize phases, which are to be transformed through the plurality of phase transformation units, with each other and the operation unit includes a plurality of operation bars configured to connect the plurality of phase transformation units, one or more guide bars configured to connect the plurality of operation bars, and a guide roller configured to guide movement of the one or more guide bars while in contact with the one or more guide bars.

Another aspect of the present disclosure provides a phase transformation unit including a first circuit board with a first circuit pattern, a second circuit board with a second circuit pattern connected to the first circuit pattern while a region of the second circuit pattern overlaps the first circuit pattern, a moving part configured to pressurize the second circuit board against the first circuit board to move the second circuit board in a first direction and change an overlap length of the first circuit pattern and the second circuit pattern to transform phases using the changed overlap length, and a housing disposed on the first circuit board and configured to accommodate the first circuit pattern and the second circuit pattern.

Another aspect of the present disclosure provides a phase transformation method performed by a phase shifter, which includes a support frame, a plurality of phase transformation units on the support frame, an operation unit connected to the plurality of phase transformation units to synchronize phases, which are to be transformed through the plurality of phase transformation units, with each other, and a driving unit configured to operate the operation unit, the phase transformation method including: obtaining an input value corresponding to phases to be transformed, producing a result value, for transforming the phases, from the input value and a result value stored beforehand, and synchronizing the phases, which are to be transformed through the plurality of phase transformation units, with each other by operating the driving unit and the operation unit on the basis of the result value.

In an embodiment, the reference value may include an arithmetic expression of a relative ratio or comparison data generated on the basis of a transformation range of the input value and a driving range of the operation unit.

In an embodiment, the driving unit may include a motor with a rotation shaft and a plurality of gears on the rotation shaft.

In an embodiment, the reference value may include an arithmetic expression of a gear ratio or comparison data generated on the basis of two or more gears of the plurality of gears.

In an embodiment, the result value may include consecutive values for operating the operation unit at a low speed within a predetermined range through the driving unit and operating the operation unit at a high speed through the driving unit when a load is not applied to the driving unit.

Other embodiments are provided in detail in the detailed description and drawings.

Advantageous Effects

According to the present disclosure, a phase shifter includes a plurality of phase transformation units on a support frame and the plurality of phase transformation units are operated simultaneously by an operation unit and a driving unit connected thereto, thereby simultaneously transforming a plurality of phases to be the same.

Various and beneficial advantages and effects of the present disclosure are not limited to the above description, and will be more easily understood in the course of describing specific embodiments of the present disclosure.

BEST MODE FOR CARRYING OUT THE INVENTION

Hereinafter, embodiments of the present disclosure will be described in detail with reference to the accompanying drawings below so that the embodiments may be easily implemented by those of ordinary skill in the art.

The present disclosure may be embodied in many different forms and is not limited to the embodiments set forth herein.

For reference, a phase transformation unit defined in the present disclosure may be understood generally as a phase shifter.

Figure 1:
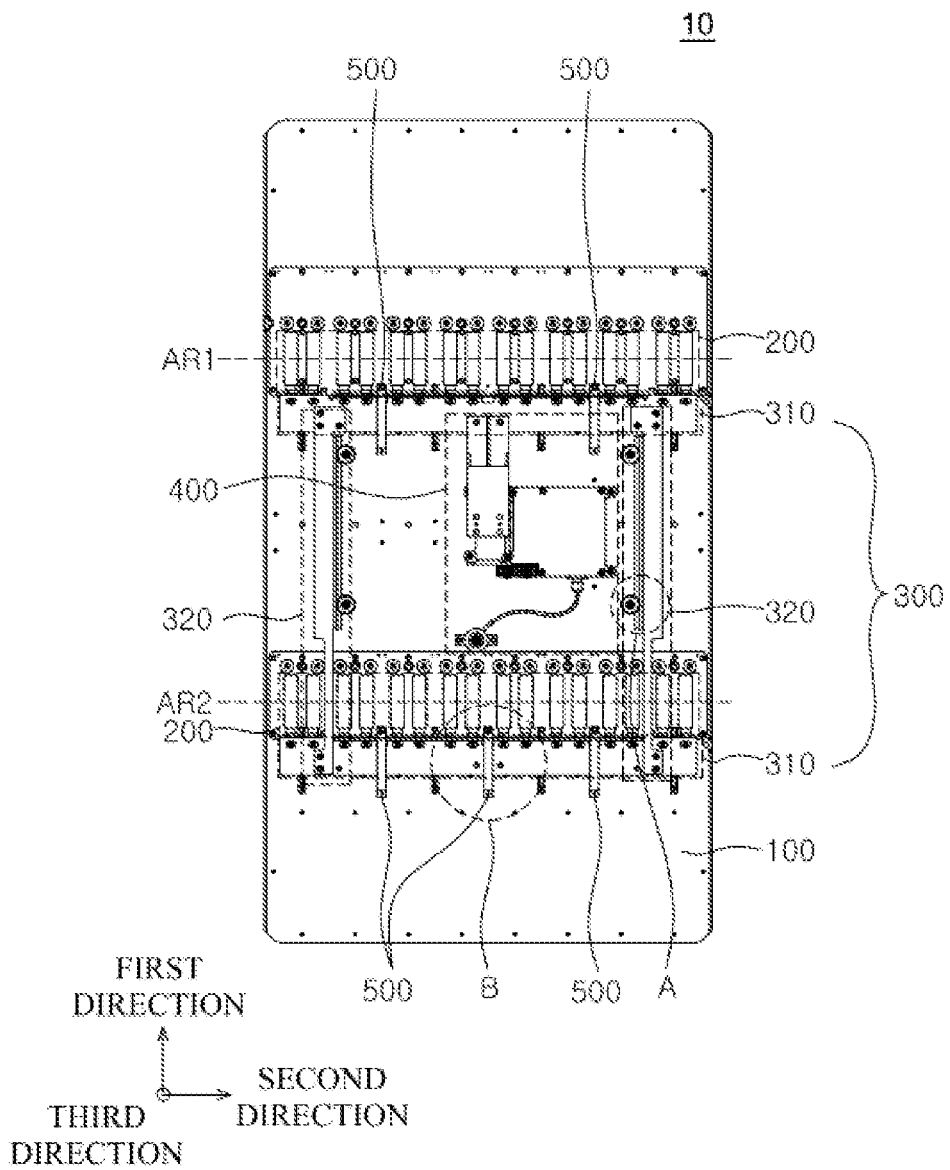
FIG. 1 is a top view of a phase shifter according to an embodiment of the present disclosure.

FIG. 1 is a top view of a phase shifter according to an embodiment of the present disclosure.

As shown in FIG. 1, a phase shifter 10 of the present disclosure is a device capable of changing a steering angle of a beam emitted from an antenna and may shift, i.e., transform, a phase of a signal transmitted to the antenna through a plurality of phase transformation units 200.

To this end, the phase shifter 10 may include a support frame 100, a phase transformation unit 200, an operation unit 300, and a driving unit 400.

A plurality of phase transformation units 200 may be disposed on the support frame 100. The support frame 100 may be configured as a planar frame and formed of a hard material, e.g., a metal material such as aluminum, to support the plurality of phase transformation units 200. The support frame 100 may have a quadrangular shape to arrange the plurality of phase transformation units 200 in an array form. However, the material and shape of the support frame 100 are not limited to the above examples.

The plurality of phase transformation units 200 may be disposed in the form of a plurality of arrays on the support frame 100. Specifically, the plurality of phase transformation units 200 may be arranged on the support frame 100 in the form of arrays spaced from each other in a second direction, and the arrays of the phase transformation units 200 may be spaced from each other in a first direction.

FIG. 1 illustrates that the plurality of phase transformation units 200 are arranged in a pair of arrays AR1 and AR2 at both side in a vertical direction, i.e., in the second direction, with respect to a center of the support frame 100, but the present disclosure is not limited thereto. For example, the plurality of phase transformation units 200 may be arranged in three or more arrays on the support frame 100.

The operation unit 300 may be connected to the plurality of phase transformation units 200 to synchronize phases, which are to be transformed through the plurality of phase transformation units 200, with each other. Specifically, the operation unit 300 may change a total length of a transmission line connected in the plurality of phase transformation units 200, i.e., a total length of a signal line connected to an antenna, to synchronize phases with each other, as will be described in detail below.

The driving unit 400 may drive the operation unit 300. Specifically, the driving unit 400 may drive the operation unit 300 in structural connection with the operation unit 300.

Figure 2:
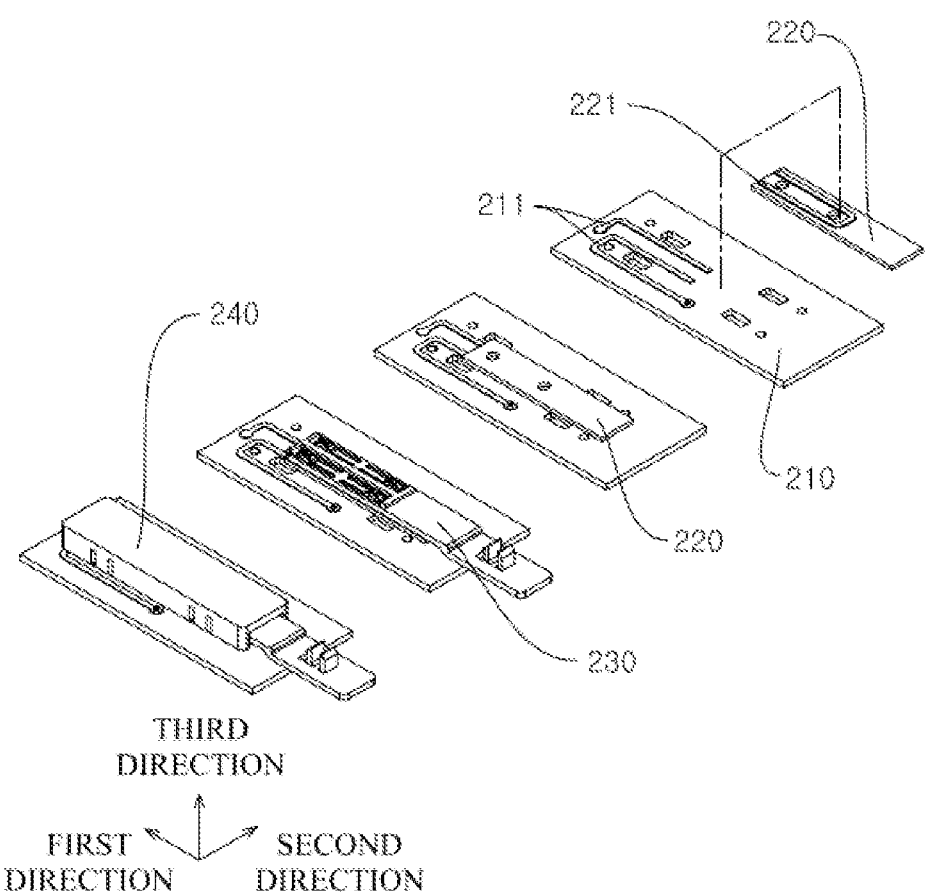
FIG. 2 is an exploded perspective view of a phase transformation unit according to an embodiment of the present disclosure, in which components are sequentially disassembled.

FIG. 2 is an exploded perspective view of a phase transformation unit according to an embodiment of the present disclosure, in which components are sequentially disassembled. For reference, more components have been disassembled from left to right among the figures shown in FIG. 2.

As shown in FIG. 2, each of a plurality of phase transformation units may include a first circuit board 210, a second circuit board 220, a moving member 230, and a housing 240.

According to an embodiment, the first circuit board 210 and the second circuit board 220 may be printed circuit boards (PCBs), the first circuit board 210 may include a first circuit pattern 211, and the second circuit board 220 may include a second circuit pattern 221. In this case, the first circuit pattern 211 and the second circuit pattern 221 may form a circuit pattern as a part of a transmission line for transmitting a signal to an antenna.

A surface of the second circuit board 220 on which the second circuit pattern 221 is disposed may face a surface of the first circuit board 210 on which the first circuit pattern 211 is disposed so that the second circuit pattern 221 may be overlappingly connected to the first circuit pattern 211. Accordingly, a region of the second circuit pattern 221 may be overlappingly connected to the first circuit pattern 211.

A length of the region of the second circuit pattern 221 overlapping the first circuit pattern 211 may change when the operation unit 300 is driven. Specifically, the second circuit board 220 including the second circuit pattern 221 may be disposed on one surface of the moving member 230, and an overlap length of the first circuit pattern 211 and the second circuit pattern 221, i.e., a length of the circuit pattern, may change when the moving member 230 connected to the operation unit 300 moves in the first direction. For example, the first circuit board 210 is stopped while the second circuit board 220 is moved together with the moving member 230 in the first direction and thus the length of the circuit pattern may be changed by a moving distance of the second circuit board 220 in the first direction.

The housing 240 may be disposed on the first circuit board 210 and accommodate the first circuit pattern 211 and the second circuit pattern 221. According to an embodiment, the moving member 230 and the housing 240 may be formed of a nonconductive material so as not to distort a signal transmitted through the first circuit pattern 211 and the second circuit pattern 221.

Although FIG. 2 illustrates that the first circuit pattern 211 is formed on the first circuit board 210, the first circuit pattern 211 may be formed on the housing 240. For example, a lower surface of the housing 240 may be provided instead of the first circuit board 210, and the first circuit pattern 211 may be formed on the lower surface of the housing 240, i.e., a surface of the housing 240 in contact with a surface of the moving member 230.

In addition, the second circuit pattern 221 is illustrated as being formed on the second circuit board 220 but may be formed on the moving member 230. That is, in the phase transformation unit 200, at least one of the first circuit board 210 and the second circuit board 220 may be omitted to reduce manufacturing processes of the phase transformation unit 200.

Referring back to FIG. 1, the operation unit 300 may be connected to the plurality of phase transformation units 200 to synchronize a plurality of phases with each other. Specifically, the operation unit 300 may include a plurality of operation bars 310 for connecting a side of one of the plurality of phase transformation units 200 arranged in an array to a side of another and one or more guide bars 320 for connecting the plurality of operation bars 310. According to an embodiment, the plurality of operation bars 310 may be arranged to correspond to the number of the arrays of the plurality of phase transformation units 200. For example, a pair of operation bars 310 may be disposed as the pair of arrays AR1 and AR2 are arranged.

The plurality of operation bars 310 may be connected to the one or more guide bars 320 so that the plurality of operation bars 310 may be simultaneously moved in the first direction.

The one or more guide bars 320 may be disposed to form a pair of guide bars 320 for connecting both sides of the plurality of operation bars 310. When both sides of the operation bars 310 are connected by the pair of guide bars 320, the movement of the plurality of phase transformation units 200 may be corrected by the guide bar 320 connected to one side of each of the operation bars 310 even when the movement of the guide bar 320 connected to another side of each of the operation bars 310 is distorted.

Although FIG. 1 illustrates that, according to an embodiment, the pair of guide bars 320 are connected to both sides of a pair of operation bars 310, three or more operation bars 310 may be connected to the pair of guide bars 320 when necessary. For example, a pair of a first guide bar 320 and a second guide bars 320 connected to both sides of a first operation bar 310 may be respectively connected to opposite sides of a second operation bar 310 and a third operation bar 310, and thus the first operation bar 310, the second operation bar 310 and the third operation bar 310 may be simultaneously moved in the first direction through the first guide bar 320 and the second guide bar 320.

As described above, the plurality of operation bars 310 may be simultaneously moved in the first direction through the one or more guide bars 320. The plurality of operation bars 310 may be stably and simultaneously moved in the first direction through the plurality of guide bars 320 without causing distortion of any side of the plurality of operation bars 310.

In addition, as the plurality of operation bars 310 are simultaneously moved, the operation unit 300 may transform a plurality of phases to be the same, i.e., synchronize the plurality of phases with each other.

The driving unit 400 may be disposed on the support frame 100 to drive the operation unit 300. Specifically, the driving unit 400 may be connected to at least one operation bar 310 among the plurality of operation bars 310 to provide a driving force to the plurality of operation bars 310 to be moved in the first direction. For example, the driving unit 400 may be an actuator.

The phase shifter 10 according to an embodiment of the present disclosure has been described above. According to the present disclosure, the phase shifter 10 includes the plurality of phase transformation units 200 on the support frame 100, and the plurality of phase transformation units 200 may be simultaneously operated by the operation unit 300 and the driving unit 400 connected thereto to synchronize all of a plurality of phases with each other.

A structure of the driving unit 400 for operation of the plurality of phase transformation units 200 will be described below.

Figure 3:
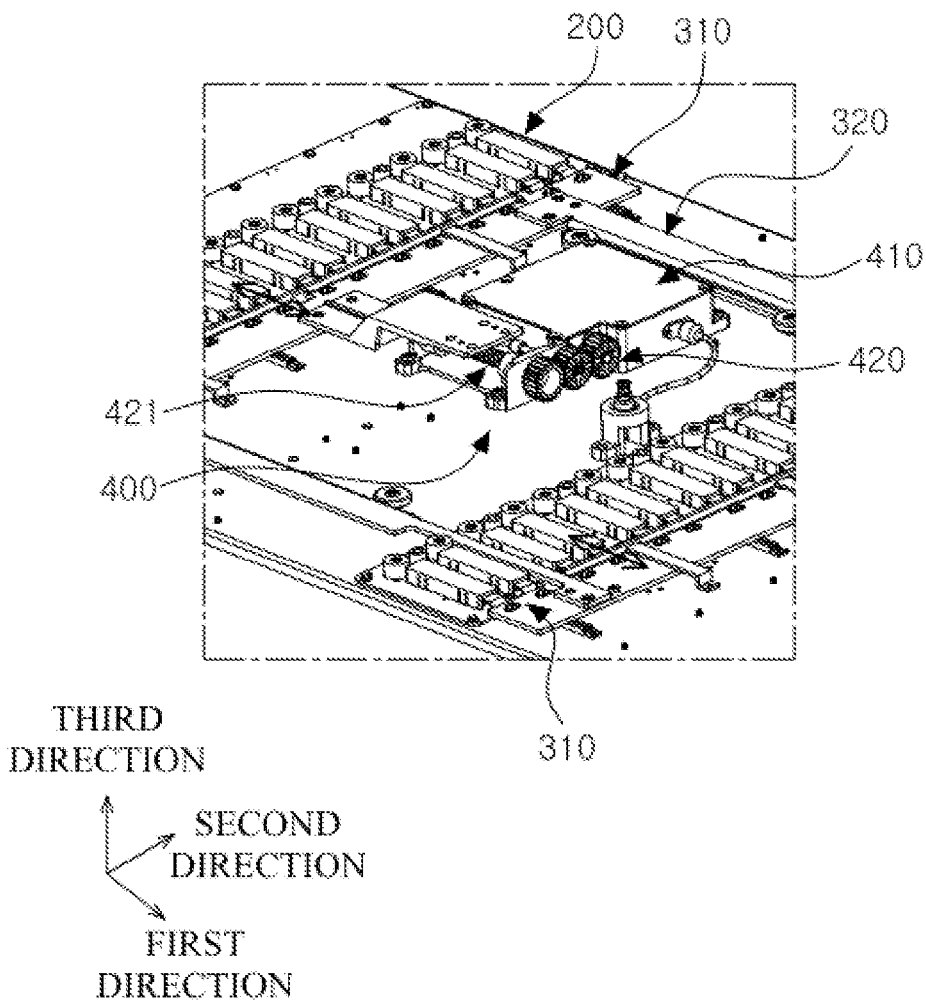
FIG. 3 is a perspective view of a driving unit according to an embodiment of the present disclosure.

FIG. 3 is a perspective view of a driving unit according to an embodiment of the present disclosure.

As shown in FIG. 3, a driving unit 400 may include a motor 410 and a plurality of gears 420. The motor 410 may include a rotation shaft, and the plurality of gears 420 may be rotated in connection with the rotation axis of the motor 410. For example, a gear 420 rotating first among the plurality of gears 420 may be rotated in connection with the rotation shaft of the motor 410, and gears engaged with the first rotating gear may be rotated.

Alternatively, the plurality of gears 420 may be rotated in connection with the movement of the plurality of operation bars 310. Accordingly, the plurality of gears 420 may move the plurality of operation bars 310 and the moving members 230 of the plurality of phase transformation units 200 connected to the plurality of operation bars 310 in the first direction by a driving force delivered from the motor 410.

For example, a gear 420 rotating last among the plurality of gears 420 and one of the plurality of operation bars 310 may be connected to a ball screw 421 to convert a rotary motion of the gears 420 into a linear motion of the plurality of operation bars 310.

Because the plurality of gears 420 are provided, a rotation speed of the motor 410 may be reduced according to a gear ratio and a movement speed of the plurality of operation bars 310 may be reduced not to be higher than necessary.

Figure 4:
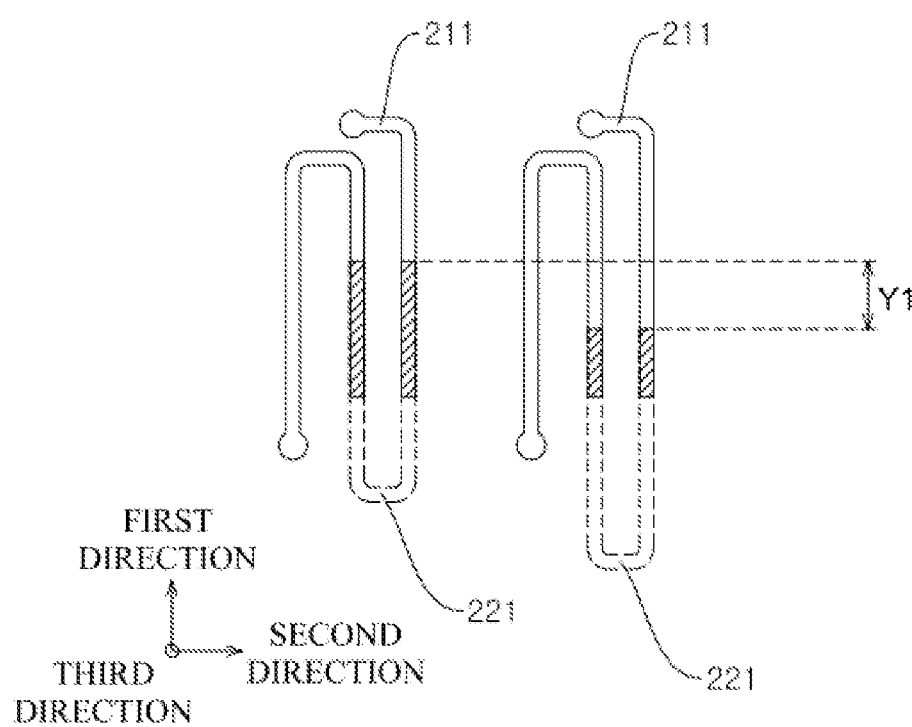
FIG. 4 is a schematic diagram for describing a method of changing an overlap length of a circuit pattern in a phase transformation unit according to an embodiment of the present disclosure.

FIG. 4 is a schematic diagram for describing a method of changing an overlap length of a circuit pattern in a phase transformation unit according to an embodiment of the present disclosure.

FIG. 4 shows the first circuit pattern 211 and the second circuit pattern 221 included in each the plurality of phase transformation units 200 as shown in FIG. 3 (although the plurality of phase transformation units 200 is not shown in FIG. 4). In FIG. 4, shaded regions of the first circuit pattern 211 and the second circuit pattern 221 may overlap each other. A length of a circuit pattern may decrease as the overlap length increases and increase as the overlap length decreases.

As the motor 410 and the plurality of gears 420 as shown in FIG. 3 (although the motor 410 and the plurality of gears 420 are not shown in FIG. 4), are driven, an overlap length of the first circuit pattern 211 and the second circuit pattern 221 may change due to the plurality of operation bars 310 and phases may change due to a difference Y1 between lengths of the circuit pattern.

That is, a driving range of the plurality of operation bars 310 may correspond to the overlap length of the first circuit pattern 211 and the second circuit pattern 221. For example, the driving range of the plurality of operation bars 310 may be in the range of 0 mm to 14 mm, and the overlap length of the circuit pattern may be in the range of 0 mm to 14 mm.

The driving unit 400 according to an embodiment of the present disclosure has been described above. Hereinafter, the structure of the operation unit 300 operating by the driving force formed by the driving unit 400 will be described.

Figure 5:
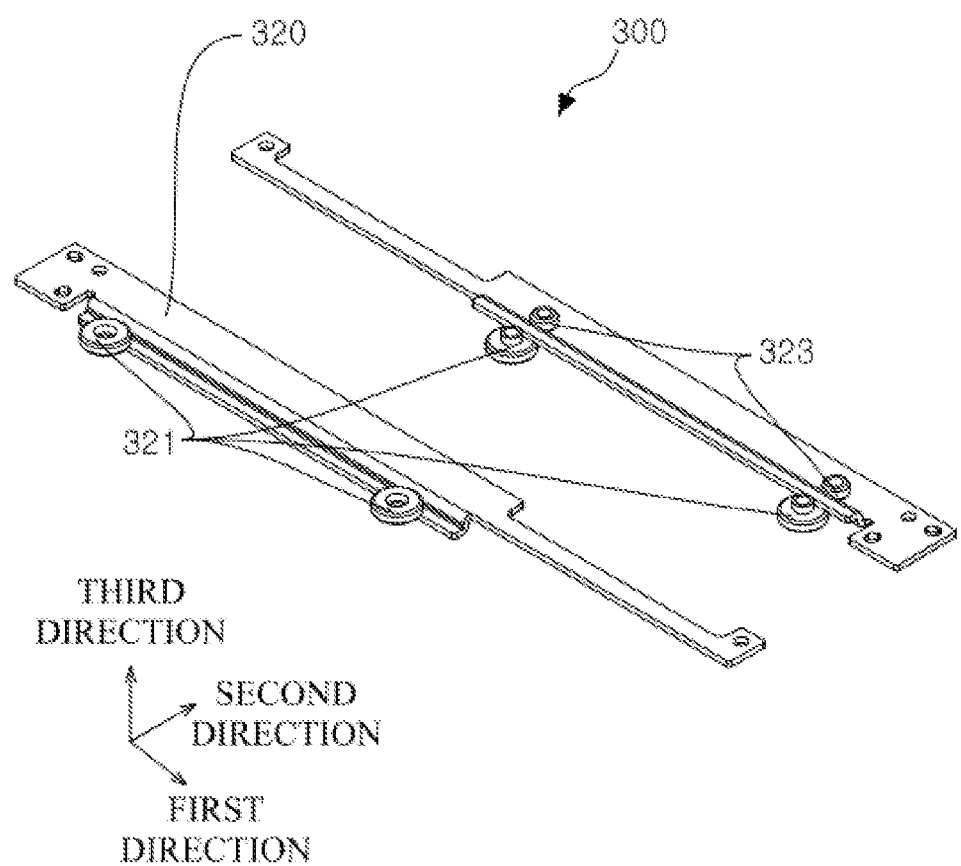
FIG. 5 is a perspective view of a guide bar of an operation unit according to an embodiment of the present disclosure.

FIG. 5 is a perspective view of a guide bar of an operation unit according to an embodiment of the present disclosure. For reference, the left diagram of FIG. 5 is a top view of a guide bar, and the right diagram of FIG. 5 is a bottom view of the guide bar.

As shown in FIG. 5, a guide bar 320 may be moved in the first direction by the driving unit and may further include a first guide roller 321 and a second guide roller 323 at a region thereof for smooth movement in the first direction.

In addition, the guide bar 320 may include two first guide rollers 321 and two second guide rollers 323 and may include one or three or more first guide rollers 321 and one or three or more second guide rollers 323 as needed.

Movement of the guide bar 320 in a second direction and a third direction may be limited and movement thereof in the first direction may be stably performed due to a combining structure between the first and second guide rollers 321 and 323.

Figure 6:
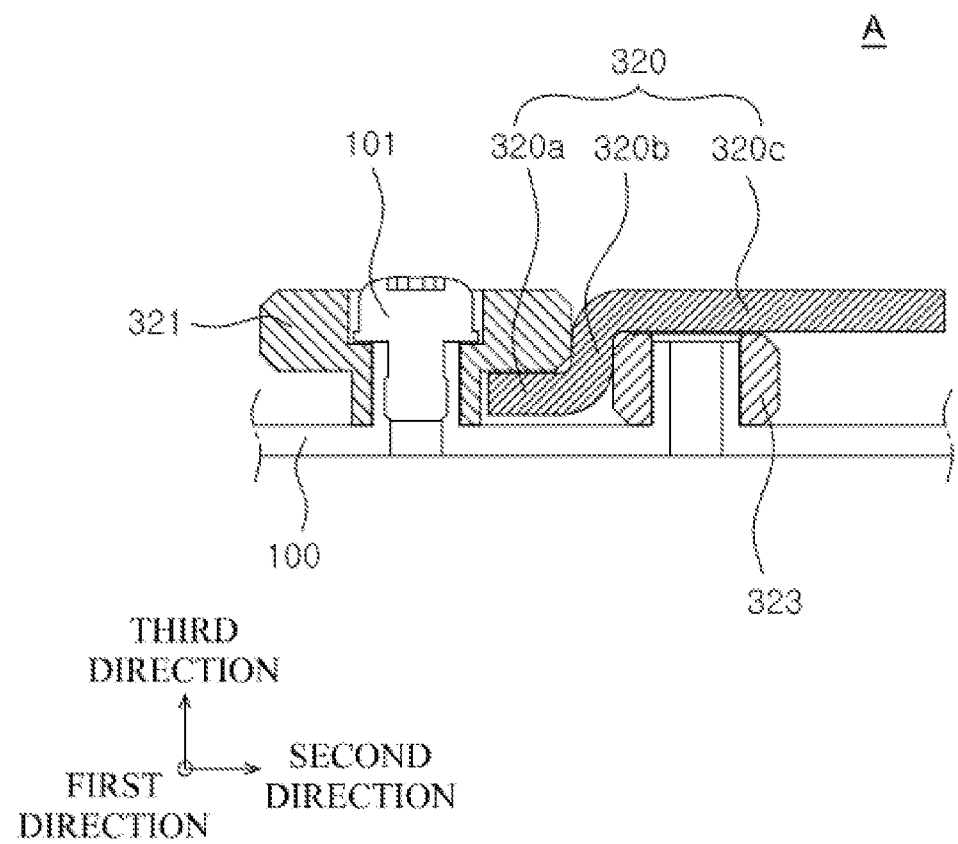
FIG. 6 is an enlarged view of a cross section of a region A shown in FIG. 1.

FIG. 6 is an enlarged view of a cross section of a region A of the phase shifter 10 shown in FIG. 1.

As shown in FIG. 6, a cross section of the guide bar 320 facing a front side of the phase shifter (in the first direction) may be bent, and the guide bar 320 may be divided into a first guide portion 320a, a second guide portion 320b, and a third guide portion 320c with respect to a bent region of the guide bar 320.

The first guide portion 320a may be provided to face the support frame 100, and the second guide portion 320b may be bent from the first guide portion 320a and extend in a direction away from the support frame 100. The third guide portion 320c may be bent from the second guide portion 320b and extend parallel to the first guide portion 320a.

The first guide roller 321 may be provided on the first guide portion 320a. Specifically, a lower surface of the first guide roller 321 may be in contact with the first guide portion 320a and a side surface thereof may be in contact with one side surface of the second guide portion 320b.

The second guide roller 323 may be provided below the third guide portion 320c. Specifically, an upper surface of the second guide roller 323 may be in contact with the third guide portion 320c and a side surface thereof may be in contact with another side surface of the second guide portion 320b.

The first guide roller 321 and the second guide roller 323 may limit the movement of the guide bar 320 on a plane of the support frame 100 in the second direction perpendicular to the first direction and limit the movement of the guide bar 320 on the same plane of the support frame 100 in the third direction perpendicular to the first direction and the second direction. Specifically, movement of the second guide portion 320b toward one side in the second direction (a right side on which the second guide roller 323 is disposed) may be limited by the first guide roller 321, and movement of the second guide portion 320b toward the other side in the second direction (a left side on which the second guide roller 323 is disposed) may be limited by the second guide roller 323. In addition, movement of the first guide portion 320a toward one side in the third direction (an upper side on which the first guide roller 321 is disposed) may be limited by the first guide roller 321, and movement of the third guide portion 320c toward the other side in the third direction (a lower side on which the second guide roller 323 is disposed) may be limited by the first guide roller 321.

As described above, the movements of the guide bar 320 in the second direction and third direction may be limited and the movement thereof in the first direction may be smoothly performed through the first guide roller 321 placed on one side of the guide bar 320 and the second guide roller 323 placed on the other side of the guide bar 320.

A rotation shaft on a plane of the support frame 100 is inserted into the first guide roller 321, and the first guide roller 321 may be fixed onto the rotation shaft through a fixing member 101. A rotation shaft on the plane of the support frame 100 may be inserted into the second guide roller 323. Although not shown in the drawings, the second guide roller 323 may be fixed onto the rotation shaft through an additional fixing member (not shown), similar to the first guide roller 321.

As the first guide roller 321 and the second guide roller 323 are rotated about the rotation shafts arranged in parallel to each other, movements of the guide bar 320 in the second direction and the third direction may be limited to correspond to each other, thereby more smoothly limiting the movements of the guide bar 320 in the second direction and the third direction.

In addition, the first guide roller 321 and the second guide roller 323 may be formed of a material that minimizes damage due to friction. In an embodiment, the first guide roller 321 and the second guide roller 323 may be formed of a wear-resistant material, such as heat-resistant plastic, and particularly, polyphenylene sulfide (PPS), a liquid crystal polymer (LCP) or polytetrafluoroethylene (PPTE).

As described above, the first guide roller 321 and the second guide roller 323 are formed of the wear-resistant material, and thus degradation of the performance thereof of limiting the movement of the guide bar 320 due to the wear of the first and second guide rollers 321 and 323 during repetitive movement of the guide bar 320 may be prevented and the durability of the phase shifter 10 may be improved.

The operation unit 300 according to an embodiment of the present disclosure has been described above. A structure of the phase transformation unit 200 for changing the overlap length of the first circuit pattern 211 and the second circuit pattern 221 according to the driving of the operation unit 300 will be described below.

Figure 7A:
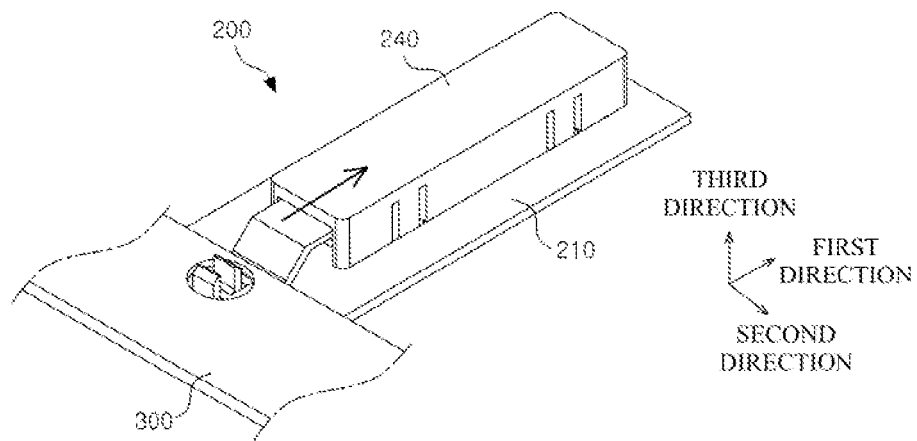
FIGS. 7A and 7B are perspective views of a phase transformation unit according to an embodiment of the present disclosure.
Figure 7B:
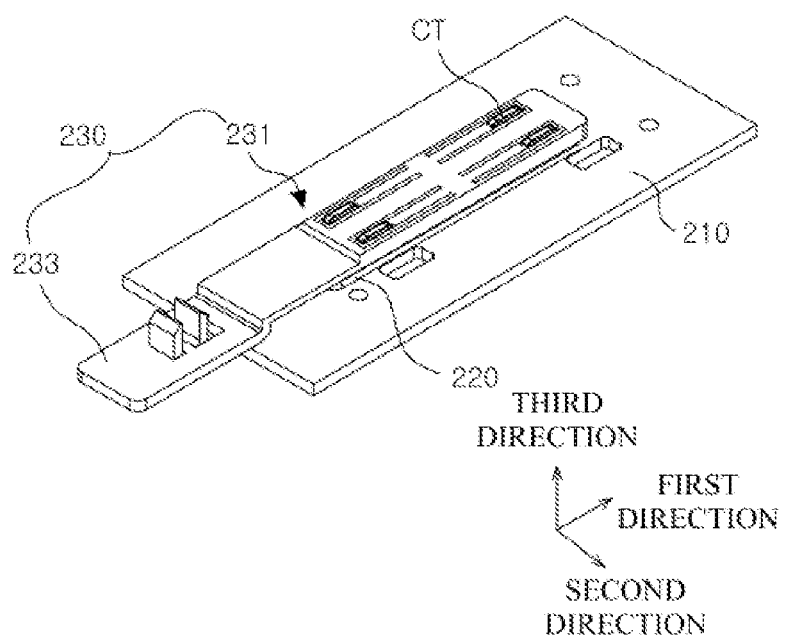

FIGS. 7A and 7B are perspective views of a phase transformation unit of the phase shifter 10 shown in FIG. 1 according to an embodiment of the present disclosure. For reference, FIG. 7A is a diagram including a housing, and FIG. 7B is a diagram excluding the housing.

As shown in FIGS. 7A and 7B, each of the plurality of phase transformation units 200 (FIG. 7A) may further include a moving member 230 to change the overlap length of the first circuit pattern 211 and the second circuit pattern 221 as shown in FIG. 2 (although the first circuit pattern 211 and the second circuit pattern 221 are shown in FIGS. 7A and 7B). Specifically, referring to FIG. 7B, the moving member 230 may have a shape with a bent cross section when viewed from a side of the phase shifter 10 (in the second direction) and include a first moving part 231 and a second moving part 233 divided with respect to the bent shape.

The second circuit board 220 (FIG. 7B) may be provided on the first moving part 231, and the second moving part 233 may extend from the first moving part 231 and be fixedly combined with the operation unit 300 (FIG. 7A). For example, a protruding portion of the second moving part 233 may be inserted into a hole of the operation unit 300 to be fixedly coupled with the operation unit 300. In this case, one end of the protruding portion may have a stopper shape to prevent separation of the protruding portion after being inserted into the hole of the operation unit 300.

The moving member 230 may be moved together with the second circuit board 220 in the first direction by the operation unit 300, thus changing the overlap length of the first circuit pattern 211 and the second circuit pattern 221.

In an embodiment, the second circuit board 220 disposed on the moving member 230 may be spaced a small distance from the first circuit board 210 in the third direction, and the second circuit pattern 221 may be adhered to the first circuit pattern 211 due to an elastic force of the moving member 230. Specifically, the moving member 230 may have an elastic structure that pressurizes the second circuit board 220 by an elastic force in a direction in which the first circuit board 210 is disposed, so that the second circuit pattern 221 may be adhered to the first circuit pattern 211. For example, the elastic structure may be a structure having an elastic shape or formed of an elastic material.

First, a structure in which the moving member 230 has an elastic shape will be described below.

As shown in FIGS. 7A and 7B, the first moving part 231 may have a cantilever shape CT (FIG. 7B) with a free end. Specifically, during movement of the moving member 230 in the first direction, the free end of the cantilever shape CT of the first moving part 231 may come into contact with an inner side of the housing 240 (FIG. 7A), thereby obtaining an elastic force. The second circuit board 220 may be pressurized by the first moving part 231 obtaining the elastic force, and the second circuit pattern 221 of the pressurized second circuit board 220 may be adhered to the first circuit pattern 211. In this case, the first moving part 231 may have an elastic force sufficient to maintain adhesion between the first circuit pattern 211 and the second circuit pattern 221 but not to pressurize the first moving part 231 more than necessary.

The moving member 230 may be formed of a plastic-based material to easily form the cantilever shape CT of the first moving part 231.

FIGS. 7A and 7B illustrate that an elastic force is obtained when the free end of the cantilever shape CT of the first moving part 231 comes into contact with the inner side of the housing 240 but embodiments of the present disclosure are not limited thereto. For example, the elastic force may be obtained when the free end of the cantilever shape CT of the first moving part 231 comes into contact with the second circuit board 220.

As described above, the shape of the moving member 230 is formed with an elastic structure, so that the second circuit board 220 may not be pressurized more than necessary while the adhesion between the first circuit board 210 and the second circuit board 220 is maintained, thereby preventing damage to the circuit pattern.

Next, a structure in which the moving member 230 is formed of an elastic material will be described below.

Figure 8:
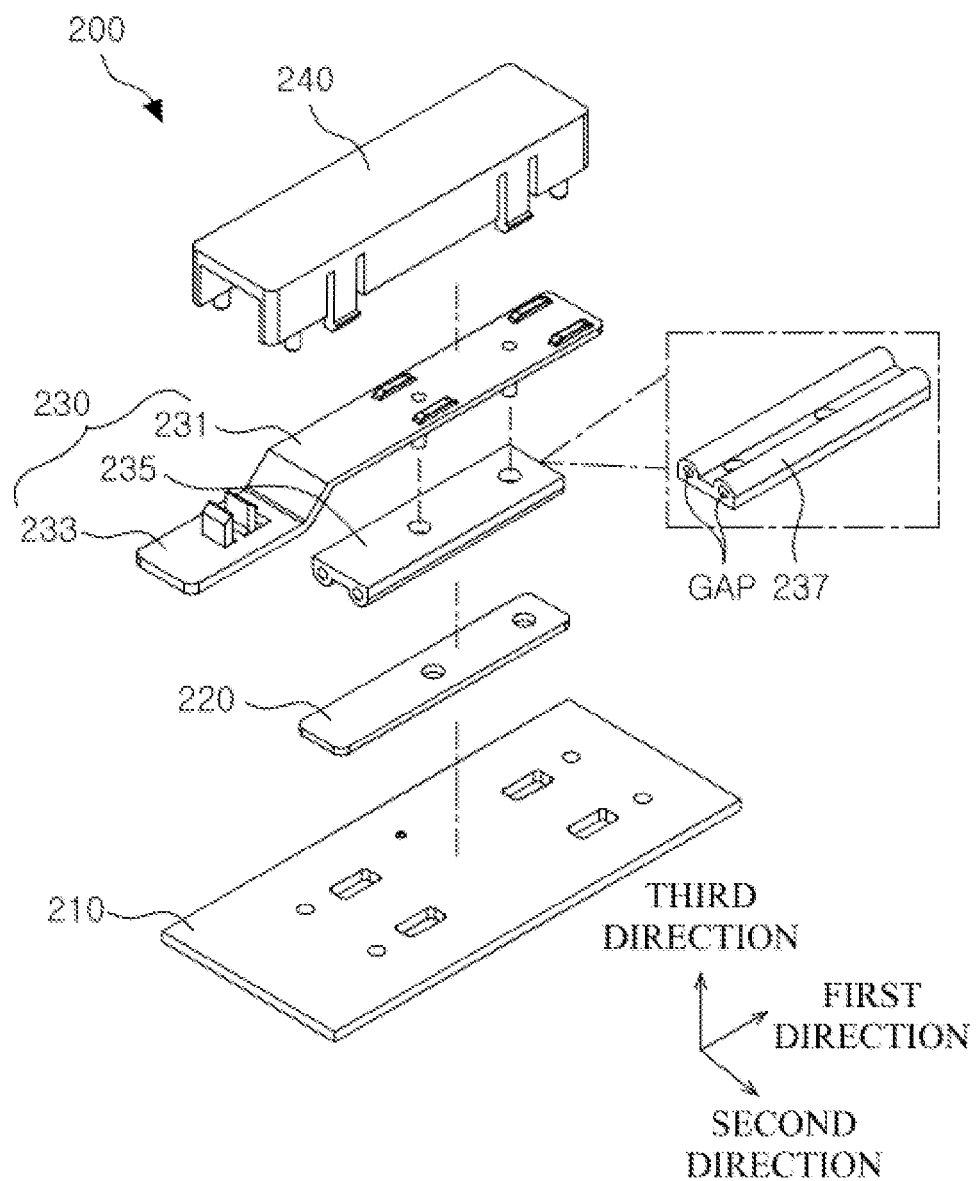
FIGS. 8 and 9 are perspective views for describing structures of an elastic member according to various embodiments of the present disclosure.
Figure 9:
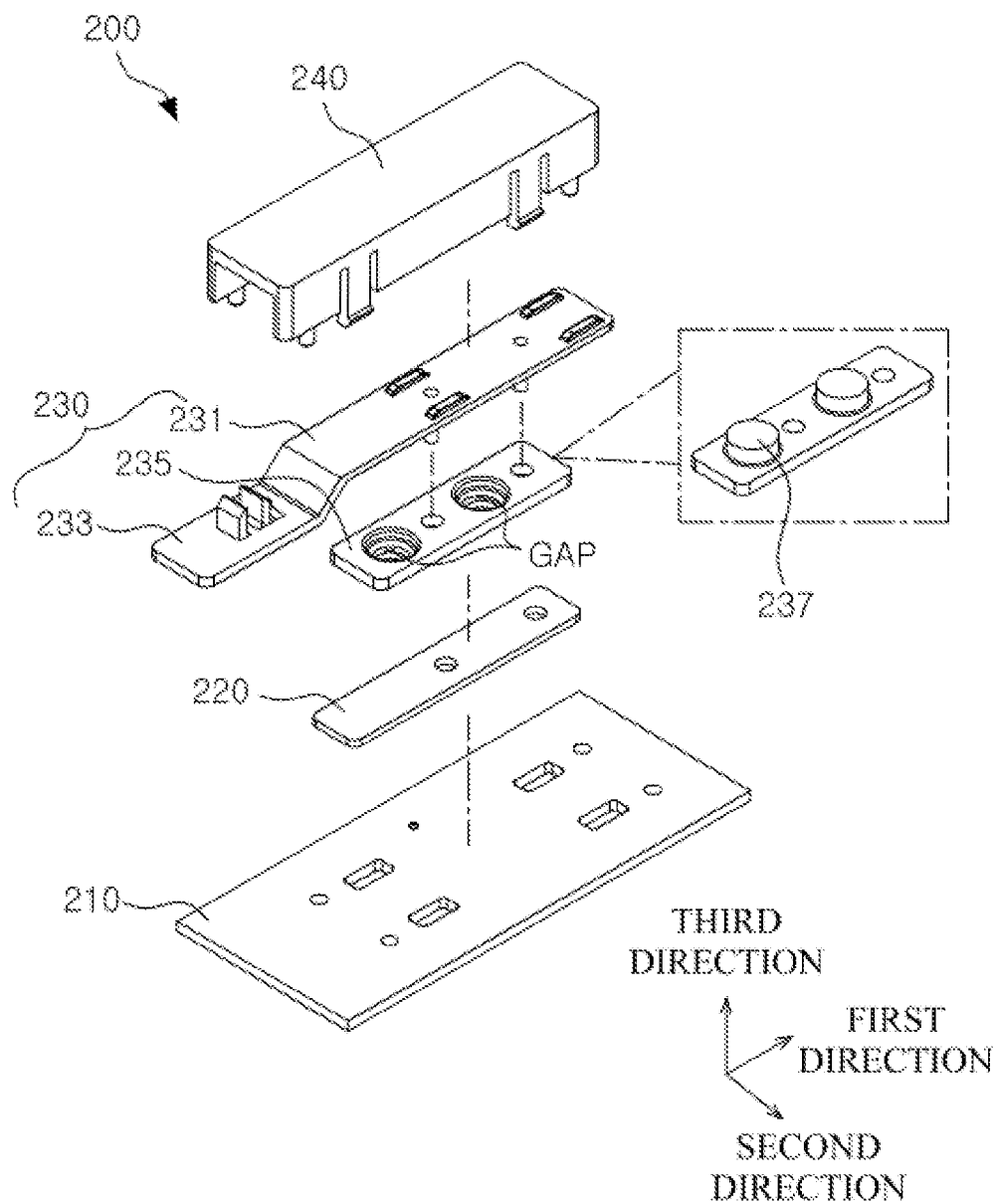

FIGS. 8 and 9 are perspective views for describing a structure of an elastic member according to various embodiments of the present disclosure.

As shown in FIG. 8, the moving member 230 may further include an elastic member 235 to provide an elastic force.

The elastic member 235 may be disposed between the second circuit board 220 and the first moving part 231 and thus the second circuit board 220 may be pressurized in a direction in which the first circuit board 210 is located. For example, the elastic member 235 may be formed of an elastic material such as rubber, silicone, or the like.

Although not shown in the drawings, a plurality of through-holes may be formed in the elastic member 235 to reduce the elastic force of the elastic member 235, thereby improving mobility of the second circuit board 220.

As shown in FIGS. 8 and 9, the elastic member 235 may further include a protrusion 237.

The protrusion 237 may be provided on at least one of both sides of the elastic member 235 in contact with the first moving part 231 or the second circuit board 220. For example, the protrusion 237 may be provided on one side of the elastic member 235 in contact with the first moving part 231 or provided on both sides of the elastic member 235 to be in contact with the first moving part 231 and the second circuit board 220.

When the protrusion 237 is provided on the elastic member 235, pressure may be locally concentrated on the second circuit board 220 through the protrusion 237 rather than pressurizing the entire second circuit board 220 through the surface of the elastic member 235, thereby facilitating the pressurizing of the second circuit board 220.

According to an embodiment, an empty space GAP may be formed inside the protrusion 237 in the first direction to facilitate the pressurizing of the second circuit board 220 and prevent excessively high pressure from being applied to the second circuit board 220.

As shown in FIG. 9, an inner region of the protrusion 237 may be provided with the empty space GAP.

When the elastic member 235 is formed of an elastic material, the movement of the second circuit board 220 may be obstructed when a degree of pressure applied to the second circuit board 220 against the first circuit board 210 is more than necessary. Accordingly, the protrusion 237 may be provided on the elastic member 235, and the inner region of the protrusion 237 may be provided with the empty space GAP to reduce pressure. In this case, as the first circuit board 210 is pressurized by the second circuit board 220 through the protrusion 237, the empty space GAP of the protrusion 237 may be compressed. That is, the empty space GAP may be compressed and crushed between the second circuit board 220 and the moving member 230.

As described above, pressure may be reduced due to the empty space GAP in the inner region of the protrusion 237, thereby improving the movement of the second circuit board 220 while maintaining adhesion.

The phase transformation unit 200 and the inner components thereof according to the embodiment of the present disclosure have been described above. A shape and material of the phase transformation unit 200 described above are not limited to the above-described examples.

A structure for improving the durability of the phase shifter 44 in which the plurality of phase transformation units are arranged will be described below.

Figure 10:
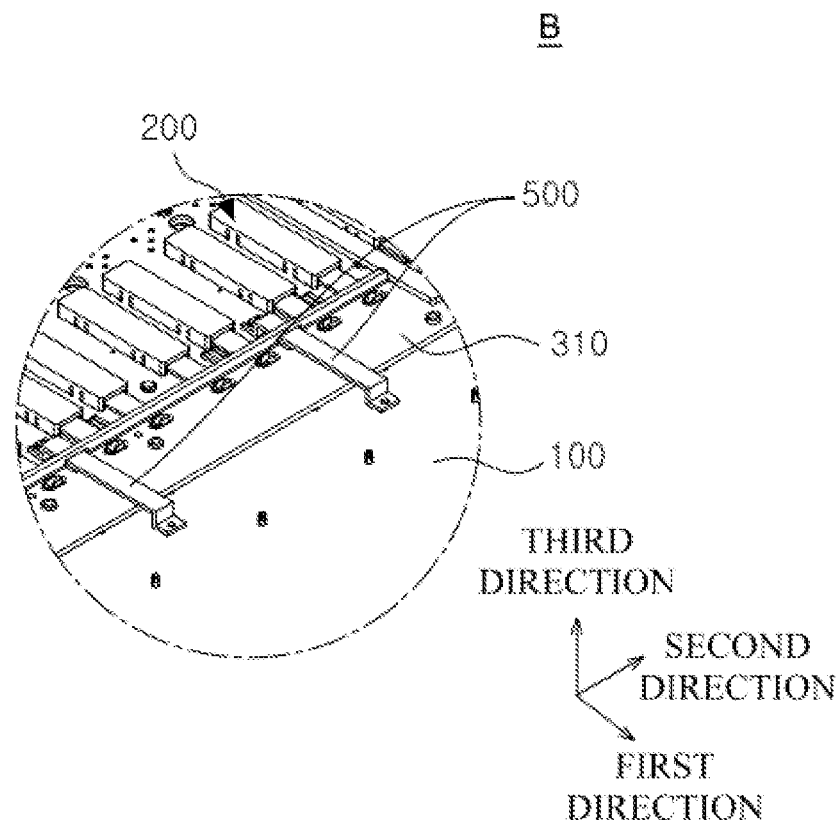
FIG. 10 is an enlarged perspective view of a region B shown in FIG. 1.

FIG. 10 is an enlarged perspective view of a region B shown in FIG. 1.

As shown in FIG. 10, the phase shifter 48 may further include a fixing part 500.

The fixing part 500 may have an arch shape, both sides of the arch shape fixing part are fixed onto the support frame 100, and an opening may be formed between both sides fixed onto the support frame 100.

One or more of the plurality of operation bars 310 may pass through the opening between the support frame 100 and the fixing part 500, and movement thereof in the third direction perpendicular to the first direction and the second direction may be limited.

As described above, the operation bar 310 may be maintained in a stable state without being lifted in the third direction during the movement thereof in the first direction by limiting the movement of the operation bar 310 in the third direction through the fixing part 500.

In an embodiment, although FIG. 1 illustrates that the fixing part 500 is disposed on each of the plurality of operation bars 310, the fixing part 500 may not be disposed on an operation bar 310 connected directly to the driving unit 400 among the plurality of operation bars 310 according to necessity. For example, the fixing part 500 may be disposed on an operation bar 310 operated not in direct connection with the driving unit 400 to limit only movement of the operation bar 310. This is because the movement of the operation bar 310 in the third direction may be limited by the driving unit 400 in place of the fixing part 500.

A series of methods of transforming a phase by the phase shifter 10 described above will be described below.

Figure 11:
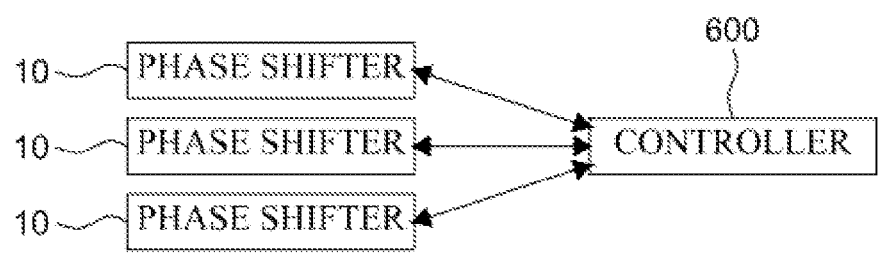
FIG. 11 is a block diagram for describing an operating method of a phase shifter according to an embodiment of the disclosure.

FIG. 11 is a block diagram for describing an operating method of a phase shifter according to an embodiment of the disclosure.

A phase shifter 10 may include a support frame 100, a plurality of phase transformation units 200, an operation unit 300, and a driving unit 400, and these components are the same as those of the phase shifter 10 described above with reference to FIGS. 1 to 10 and thus a detailed description thereof will be omitted here.

As shown in FIG. 11, the phase shifter 10 may further include a controller 600 to control an operation of the phase shifter 10. Specifically, the controller 600 may provide the driving unit 400 with an operation instruction such as an electrical signal to operate a plurality of phase transformation units 200 as shown in for example FIGS. 1 and 3 (although the driving unit 400 and the plurality of phase transformation units 200 are not shown in FIG. 11), and the operation instructions may be implemented from a computer-readable storage medium storing instructions executable by a processor.

In an embodiment, the controller 600 may store attribute values of a motor 410 of the driving unit 400 and a plurality of gears 420 to control an operation of the driving unit 400 as shown in for example FIG. 3 (although the motor 410, the driving unit 400 and the plurality of gears 420 are not shown in FIG. 11). For example, the controller 600 may store the number of gear teeth of the plurality of gears 420, a rotation ratio of the plurality of gears 420, etc.

In an embodiment, as shown in FIG. 11, operations of a plurality of phase shifters 10 may be controlled by the controller 600 or controllers 600 individually connected to the plurality of phase shifters 10.

In an embodiment, the controller 600 may transform a phase of the phase shifter 10 on the basis of a value input from an administrator.

First, the controller 600 may obtain an input value corresponding to the phase to be transformed. In an embodiment, the controller 600 may obtain a phase transformation value of the phase shifter 10 as an input value. Here, the phase transformation value may be in the range of 0° to 12° tilt, but may not be limited thereto.

In another embodiment, the controller 600 may obtain, as an input value, a change value of an overlap length of a circuit pattern in the phase transformation unit 200 or a driving range value of the operation unit 300 as shown in for example FIGS. 1 and 5 (although the operation unit 300 is not shown in FIG. 11). Here, the overlap length of the circuit pattern and the driving range value of the operation unit 300 may be in the range of 0 mm to 14 mm, but may not be limited thereto.

Next, after the input value is obtained, the controller 600 may generate a result value for transforming phases to be the same through the plurality of phase transformation units 200 as shown in for example FIGS. 1 and 3 (although the plurality of phase transformation units 200 is not shown in FIG. 11) using the input value and a reference value stored beforehand in the controller 600. Specifically, the reference value may include an arithmetic expression or comparison data. For example, the arithmetic expression may be an operation for obtaining a result value for an input value, and the comparison data may be a table listing a plurality of input values and result values corresponding to the plurality of input values calculated beforehand. That is, the comparison data stored beforehand includes result values derived for input values and thus the controller 600 may match a result value with an input value.

In an embodiment, the reference value stored in the controller 600 may include an arithmetic expression of a relative ratio and comparison data, which is generated on the basis of a transformation range of an input value and a driving range of the operation unit 300 as shown in for example FIGS. 1 and 5 (although the operation unit 300 is not shown in FIG. 11). Here, the transformation range of the input value may be a phase transformation range (e.g., in the range of 0° to 12° tilt) of the phase transformation unit 200 as shown in for example FIG. 1 (although the phase transformation unit 200 is not shown in FIG. 11), and the driving range of the operation unit 300 may be a change range (e.g., in the range of 0 mm to 14 mm) of the overlap length of the circuit pattern. More specifically, the arithmetic expression of a relative ratio may be an arithmetic expression for calculating whether the operation unit 300 is to be moved by Y mm to change a phase by X. For example, when the controller 600 inputs a tilt angle of a beam (an inclination of 6° with respect to a direction of the beam) to the arithmetic expression of a relative ratio to which the reference value is applied, a moving length (7 mm) of the operation unit 300 may be obtained as an output. That is, the controller 600 may calculate the output value, i.e., 7 mm, as an increase value of a length of the circuit pattern through the arithmetic expression of a relative ratio.

In another embodiment, the reference value stored in the controller 600 may include an arithmetic expression of a gear ratio or comparison data, which is generated based on the plurality of gears 420 as shown in for example FIG. 3 (although the plurality of gears 420 is not shown in FIG. 11). Here, the arithmetic expression of a gear ratio is data obtainable from the number of teeth of the plurality of gears 420, and the controller 600 may store the arithmetic expression of a gear ratio (e.g., the number of teeth of driven gears/the number of teeth of drive gears) of the plurality of gears 420 and insert the arithmetic expression of a gear ratio during an operation of obtaining a result value for an input value.

Next, after the result value is obtained, the controller 600 may operate the operation unit 300 as shown in for example FIG. 1 (although the operation unit 300 is not shown in FIG. 11) and the driving unit 400 as shown in for example FIG. 3 (although the driving unit 400 is not shown in FIG. 11) on the basis of the result value to transform phases. For example, the result value may be an operation instruction for changing a length of a circuit pattern, i.e., controlling a moving length of the operation unit 300, to control the amount of rotation of the driving unit 400.

In an embodiment, the controller 600 controls the driving unit 400 as shown in for example FIG. 3 (although the driving unit 400 is not shown in FIG. 11) to operate the operation unit 300 as shown in for example FIG. 1 (although the operation unit 300 is not shown in FIG. 11) on the basis of the result value and control an operation speed according to a load. Specifically, the result value may include consecutive values for operating the operation unit 300 at a low or high speed through the driving unit 400, and the operation unit 300 may be operated at the low or high speed through the driving unit 400 on the basis of the consecutive values.

The controller 600 may operate the operation unit 300 as shown in for example FIG. 1 (although the operation unit 300 is not shown in FIG. 11) at a low speed within a predetermined range according to the result value through the driving unit 400 as shown in for example FIG. 3 (although the driving unit 400 is not shown in FIG. 11), and may operate the operation unit 300 at a high speed through the driving unit 400 when a load is not applied to the driving unit 400 during the operation of the operation unit 300 at the low speed within the predetermined range. In this case, the "load" may be understood to mean a state in which the operation unit 300 is not operated due to an obstacle.

As described above, the controller 600 may operate the operation unit 300 at a low speed within the predetermined range and thereafter operate the operation unit 300 as shown in for example FIG. 1 (although the operation unit 300 is not shown in FIG. 11) at a high speed through the driving unit 400 as shown in for example FIG. 3 (although the driving unit 400 is not shown in FIG. 11), thereby preventing damage to the operation unit 300 due to an obstacle during the operation of the operation unit 300 at a high speed.

In addition, the operation unit 300 as shown in for example FIG. 1 (although the operation unit 300 is not shown in FIG. 11) and the driving unit 400 as shown in for example FIG. 3 (although the driving unit 400 is not shown in FIG. 11) may be continuously operated without being stopped according to a change of driving speed.

Although the present disclosure has been described in detail with reference to example embodiments, the present disclosure is not limited thereto and may be variously implemented within the scope of the claims.

| REFERENCE NUMERALS | |
|---|---|
| 10: phase shifter | 100: support frame |
| 101: fixing member | 200: phase transformation unit |
| 210: first circuit board | 211: first circuit pattern |
| 220: second circuit board | 221: second circuit pattern |
| 230: moving member | 231: first moving part |
| 233: second moving part | 235: elastic member |
| 237: protrusion | 240: housing |
| 300: operation unit | 310: operation bar |
| 320: guide bar | 320a: first guide portion |
| 320b: second guide portion | 320c: third guide portion |
| 321: first guide roller | 323: second guide roller |
| 400: driving unit | 410: motor |
| 420: gear | 421: ball screw |
| 500: fixing part | 600: controller |
| CT: cantilever shape | GAP: empty space |

What is claimed is:

1. A phase shifter, comprising:
a support frame;
a plurality of phase transformation units on the support frame;
an operation unit connected to the plurality of phase transformation units to synchronize phases, which are to be transformed through the plurality of phase transformation units; and
a driving unit configured to operate the operation unit,
wherein each of the plurality of phase transformation units comprises:
a first circuit pattern; and
a second circuit pattern connected to the first circuit pattern while a region of the second circuit pattern overlaps the first circuit pattern,
wherein a length of the region of the second circuit pattern overlapping the first circuit pattern changes when the operation unit is operated,
wherein the plurality of phase transformation units are arranged on the support frame in a plurality of arrays spaced apart from each other in a first direction,
wherein the operation unit comprises:
a plurality of operation bars configured to connect a side of each of the plurality of phase transformation units to one of the plurality of arrays; and
one or more guide bars configured to connect the plurality of operation bars,
wherein the phase shifter further comprises a fixing part having an arch shape, both sides of which are fixed onto the support frame and an opening between both sides of the fixing part fixed on the support frame, and
wherein, when at least one operation bar of the plurality of operation bars passes through the opening of the fixing part, movement of the at least one operation bar in a third direction perpendicular to the first direction is limited.

2. A phase shifter comprising:
a support frame;
a plurality of phase transformation units on the support frame; and
an operation unit connected to the plurality of phase transformation units to synchronize respective phases, which are to be transformed through the plurality of phase transformation units,
wherein the operation unit comprises:
a plurality of operation bars configured to connect the plurality of phase transformation units;
one or more guide bars configured to connect the plurality of operation bars; and
a guide roller configured to guide movement of the one or more guide bars while in contact with the one or more guide bars.

3. A phase shifter, comprising:
a support frame;
a plurality of phase transformation units on the support frame;
an operation unit connected to the plurality of phase transformation units to synchronize phases, which are to be transformed through the plurality of phase transformation units; and
a driving unit configured to operate the operation unit,
wherein each of the plurality of phase transformation units comprises:
a first circuit pattern; and
a second circuit pattern connected to the first circuit pattern while a region of the second circuit pattern overlaps the first circuit pattern,
wherein a length of the region of the second circuit pattern overlapping the first circuit pattern changes when the operation unit is operated,
wherein the plurality of phase transformation units are arranged on the support frame in a plurality of arrays spaced apart from each other in a first direction,
wherein the operation unit comprises:
a plurality of operation bars configured to connect a side of each of the plurality of phase transformation units to one of the plurality of arrays; and
one or more guide bars configured to connect the plurality of operation bars,
wherein the driving unit comprises:
a motor with a rotation shaft; and
a plurality of gears configured to be rotated in connection with the rotation shaft, and
wherein the plurality of operation bars are moved in connection with the rotation of the plurality of gears using the rotation shaft and thus the plurality of operation bars and one side of the plurality of phase transformation units connected to the plurality of operation bars are moved in the same direction by a driving force delivered from the motor.

4. A phase shifter, comprising:
a support frame;

a plurality of phase transformation units on the support frame;
an operation unit connected to the plurality of phase transformation units to synchronize phases, which are to be transformed through the plurality of phase transformation units; and
a driving unit configured to operate the operation unit,
wherein each of the plurality of phase transformation units comprises:
a first circuit pattern; and
a second circuit pattern connected to the first circuit pattern while a region of the second circuit pattern overlaps the first circuit pattern,
wherein a length of the region of the second circuit pattern overlapping the first circuit pattern changes when the operation unit is operated,
wherein the plurality of phase transformation units are arranged on the support frame in a plurality of arrays spaced apart from each other in a first direction,
wherein the operation unit comprises:
a plurality of operation bars configured to connect a side of each of the plurality of phase transformation units to one of the plurality of arrays; and
one or more guide bars configured to connect the plurality of operation bars, and
wherein each of the one or more guide bars comprises:
a first guide portion provided to face the support frame;
a second guide portion bent from the first guide portion and extending in a direction away from the support frame; and
a third guide portion bent from the second guide portion and extending in parallel to the first guide portion.

5. The phase shifter of claim 4, wherein each of the one or more guide bars further comprises:
a first guide roller on the first guide portion; and
a second guide roller below the third guide portion,
wherein the first guide roller and the second guide roller limit movement of the one or more guide bars on a plane of the support frame in a second direction perpendicular to the first direction and limit a movement of the one or more guide bars on the same plane in a third direction perpendicular to the first direction and the second direction.

6. The phase shifter of claim 5, wherein a lower surface of the first guide roller is in contact with the first guide portion and a side surface of the first guide roller is in contact with one side surface of the second guide portion,
an upper surface of the second guide roller is in contact with the third guide portion and a side surface of the second guide roller is in contact with another side surface of the second guide portion, and
the first guide roller and the second guide roller are rotated about respective rotation axes arranged in parallel to each other.

7. The phase shifter of claim 5, wherein the first guide roller and the second guide roller are formed of a combination of at least one of polyphenylene sulfide (PPS), a liquid crystal polymer (LCP), and polytetrafluoroethylene (PPTE).

8. A phase transformation unit, comprising:
a first circuit board with a first circuit pattern;
a second circuit board with a second circuit pattern connected to the first circuit pattern while a region of the second circuit pattern overlaps the first circuit pattern;
a moving member configured to exert pressure on the second circuit board against the first circuit board to move the second circuit board in a first direction and change an overlap length of the first circuit pattern and the second circuit pattern to transform phases using the changed overlap length; and
a housing disposed on the first circuit board and configured to accommodate the first circuit pattern and the second circuit pattern,
wherein the moving member has an elastic structure for applying pressure on the second circuit board by an elastic force in a direction in which the first circuit board is located to connect the second circuit pattern to the first circuit pattern.

9. A phase shifter comprising:
a support frame;
a plurality of phase transformation units on the support frame;
an operation unit connected to the plurality of phase transformation units to synchronize phases, which are to be transformed through the plurality of phase transformation units; and
a driving unit configured to operate the operation unit,
wherein each of the plurality of phase transformation units comprises:
a first circuit pattern; and
a second circuit pattern connected to the first circuit pattern while a region of the second circuit pattern overlaps the first circuit pattern,
wherein a length of the region of the second circuit pattern overlapping the first circuit pattern changes when the operation unit is operated,
wherein each of the plurality of phase transformation units comprises:
a first circuit board with the first circuit pattern;
a second circuit board with the second circuit pattern; and
a moving member configured to move the second circuit board in a first direction to change the length of the first circuit pattern overlapping the second circuit pattern,
wherein the moving member comprises:
a first moving part on which the second circuit board is disposed; and
a second moving part extending from the first moving part and the second moving part configured to be fixedly coupled with the operation unit, and
wherein the moving member has an elastic structure for applying pressure on the second circuit board by an elastic force in a direction in which the first circuit board is located to connect the second circuit pattern to the first circuit pattern.

10. The phase shifter of claim 9, wherein, in the moving member, the first moving part has a cantilever shape having a free end.

11. The phase shifter of claim 9, wherein the moving member further comprises an elastic member between the second circuit board and the first moving part, the elastic member forms the elastic structure of the moving member.

12. The phase shifter of claim 11, wherein the elastic member further comprises a protrusion on at least one of both sides of the elastic member to be in contact with the first moving part or the second circuit board.

13. The phase shifter of claim 12, wherein an inner region of the protrusion is an empty space, wherein the empty space is compressed when the second circuit board exerts pressure on the first circuit board through the protrusion.

14. A phase transformation method performed by a phase shifter, which includes a support frame, a plurality of phase transformation units on the support frame, an operation unit connected to the plurality of phase transformation units to synchronize phases, which are to be transformed through the plurality of phase transformation units, and a driving unit configured to operate the operation unit, the phase transformation method comprising:
obtaining an input value corresponding to phases to be transformed;
producing a result value, for transforming the phases, from the input value and a result value stored beforehand; and
synchronizing the phases with each other by operating the driving unit and the operation unit on the basis of the result value.

15. The phase transformation method of claim 14, wherein a reference value comprises an arithmetic expression of a relative ratio or comparison data generated on the basis of a transformation range of the input value and a driving range of the operation unit.

16. The phase transformation method of claim 14, wherein the driving unit comprises a motor with a rotation shaft and a plurality of gears disposed on the rotation shaft, and a reference value comprises an arithmetic expression of a gear ratio or comparison data generated on the basis of the plurality of gears.

17. The phase transformation method of claim 14, wherein the result value comprises consecutive values for operating the operation unit at a low speed within a predetermined range through the driving unit and operating the operation unit at a high speed through the driving unit when a load is not applied to the driving unit.

* * * * *